United States Patent [19]

Gordon

[11] Patent Number: 5,023,433
[45] Date of Patent: Jun. 11, 1991

[54] ELECTRICAL HEATING UNIT

[76] Inventor: Richard A. Gordon, 95 W. 3rd St., Freeport, N.Y. 11520

[21] Appl. No.: 357,332

[22] Filed: May 25, 1989

[51] Int. Cl.⁵ .............................................. H05B 3/34
[52] U.S. Cl. .................................... 219/548; 219/549; 219/545
[58] Field of Search ............... 219/348, 543, 553, 549, 219/528, 529, 545

[56] References Cited

U.S. PATENT DOCUMENTS 3,061,501 10/1962 Dittman .............................. 219/345
3,385,959 5/1968 Ames .................................... 219/543
3,781,526 12/1973 Damron .............................. 219/553
4,158,078 6/1979 Egger ................................... 219/548

Primary Examiner—Roy N. Envall, Jr.
Attorney, Agent, or Firm—Bauer & Schaffer

[57] ABSTRACT

An heating unit made of a sheet of non-woven fibrous material having carbon particles embedded therein in a concentration to provide passage of low level electricity. A pair of electrodes disposed opposite each other and a wire connecting each electrode to a source of electricity.

13 Claims, 1 Drawing Sheet

ELECTRICAL HEATING UNIT

The present invention relates to a heating unit and particularly, to a heating unit providing a safe low order of heat.

Electrical heating units providing a stable constant low order of heat, are extremely useful in supplying a source of heat directly to small reptilian type animals, housed in tanks or similar non-natural environments.

While the known types of electrical heating units for reptile or for that matter for fish tanks, accomplish their purposes in a generally satisfactory manner, they exhibit certain disadvantages. For example, some of the known devices are relatively bulky and heavy. In addition, they are relatively complex in structure and require not only extensive manufacturing procedures, but are also relatively expensive to manufacture. Another drawback to such devices is that they consume large amounts of electrical power, require extensive sealing and encasement when used in animal environments and are generally difficult to regulate requiring heat controls to obtain steady constant heat output.

There exists, therefore, a need for an electrical heating unit of the type generally referred to above which does not exhibit the mentioned disadvantages. The present invention fulfills such a need.

These objects, together with other objects and advantages will be apparant from the following disclosure.

SUMMARY OF THE INVENTION

In accordance with the present invention there is provided an electrical heating unit comprising a base sheet such as non-woven fibrous cellulose material (i.e.) having metallic, such as carbon particles embedded therein in a random arrangement and distributed throughout substantially the entire area of the non-woven sheet. A pair of electrodes are disposed adjacent opposite edges of the sheet and are attached by conventional lead wires to a source of house current (110 V, 60 cycles). The sheet, with its concentration of metal, produces a conductive member having a resistance sufficient to produce low level heat, and dependant upon the space between the electrodes, can supply a heat output in a range of from about 5 degrees F. to about 130 degrees F.

Preferably each electrode is formed of a pair of highly conductive foils such as copper or the like. Each foil, of each electrode pair is located on the upper and lower surfaces of the conductive sheet and are secured together with the sheet by use of metal staples, grommets or non-cotton thread stitching. It may be desired to further conductively connect the foil pairs by stitching a conductive wire thread through the foil or paper, or adhering the foil to the paper by use of a conductive chemical adhesive bond.

The base sheet, together with the electrodes are sealed within a sandwich of insulating cover sheets preferably formed of resilient rubbery or resinous adhesive sheets. In an embodiment of the invention, particulary disposable within the interior of a tank, the above-described heating unit is employed in combination with a hard container housing.

The heater of the present invention is particularly adaptable for use with reptile tanks or other containers known as "dry tanks" in which reptile and/or small animals, such as hamsters, ferrets, and the like are housed. The heating unit sandwiched in the resilient sheets, may be placed on the bottom floor of the tank and left exposed or covered if desired, It may be attached on the exterior wall or bottom if desired. The actual location is not critical but its location will depend on the animal's need either conductively or convectionally for heat and warmth. As for example, reptiles require added warmth by direct conduction with the skin to digest food and thus the heater unit must be placed where it can be contacted or touched by the reptile. On the other hand, the heater unit may be secured to the exterior wall of the tank so that the heat is radiated through a larger area.

Full details of the present invention are set forth in the following description.

BRIEF DESCRIPTION OF THE DRAWINGS

In order to describe the electrical heating unit of the present invention more fully, reference is directed to the accompanying drawings which are to be taken in conjunction with the following description of the invention and in which drawings.

DESCRIPTION OF THE INVENTION

Figure 1:
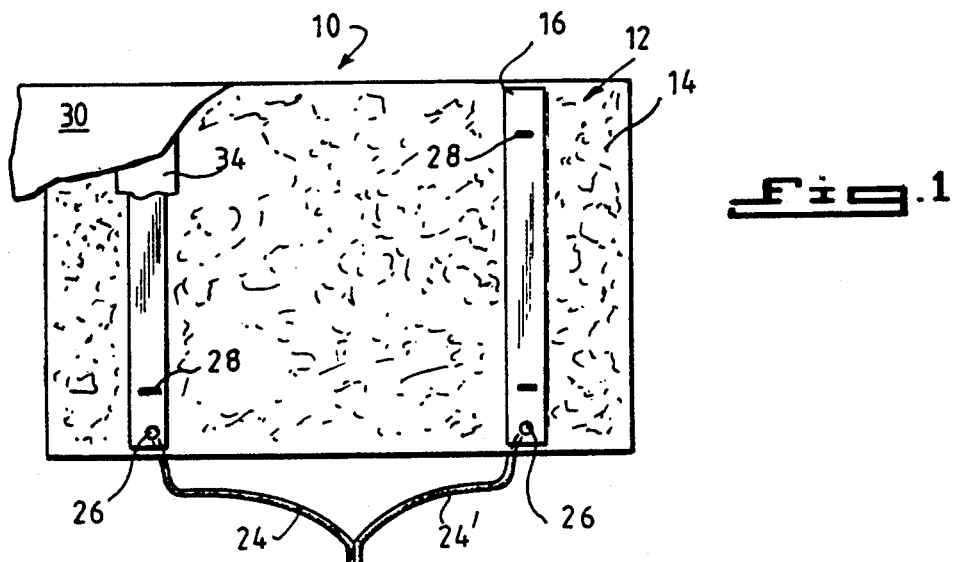
FIG. 1 is a plan view of the heating unit of the invention.

Referring now to FIG. 1, the electrical heating unit 10 according to the present invention comprises a "conductive" sheet of non-woven paper 12 in which carbon particles 14 are embedded during manufacture of the sheet. The carbon particles 14 are disposed in a random, non-directional arrangement over substantially the entire area of the sheet in a more or less substantially uniform manner. Although uniformity of distribution of the particles is not critical, it is preferred, to thus reduce hot or cold spots.

Two of electrodes 16, preferably made of copper, although they may be made of other suitable and well known conductive materials, are placed opposite each other adjacent the opposing edges of the conductive paper sheet 12.

Non-woven conductive "papers" are commercially available in many forms. The type or source of such material is not critical. In general, such material is made of a mixture of fibrous material such as cellulose, plastic, or the like in which carbon powder or particles are admixed before forming into a sheet by matting or felting. In another form, carbon particles can be pressed, as through rolling and sintering into a previously made sheet. In lieu of carbon, other conductive metallic particles may be used.

The paper sheet is denominated "conductive" although it is not so in the usual sense, in that it does not readily conduct electricity as would a copper or other metal sheet. The sheet therefore, is not "electrically hot" to the touch, and thus is relatively safe. Notwithstanding, conductivity is obtained because of the carbon content and a relatively low level of current at a relatively low resistance is passed on the application of conventional current levels on the electrodes. The concentration of carbon in the paper should be at least sufficient to allow flow of electrons from one electrode to the other, and to provide a low resistance across the paper. The greater the concentration of carbon, the less resistance. The less resistance, (low Ohms), the cooler the heating unit. The greater the resistance (high Ohms), the hotter the heater. The particular degree of heat for desired application may be readily determined by experimentation.

A sheet of between 5 to 8 inches in length and about 3 to 4 inches in width, of about 55 lbs. carbon conductive paper is most suitable for use in the present invention. Such paper is available from the manufacturer in about 60 inch width, endless rolls which can be conveniently sliced and selectively cut to size.

The copper foils forming the electrode 16 are thin, mil thickness material which can be applied to cut sheets, or may be applied as endless strips to the endless conductive paper before the paper is cut to size.

The electrodes 16 are disposed in parallel pairs 16a and 16b on the respective upper and lower surfaces of paper sheet 12 and secured in spaced relationship from each by a selected distance. The distance is selected to provide the degree of heat required for the intended purpose. The conductive sheet 12 becomes more conductive the closer the electrodes are placed to each other and thus will produce more heat than if the electrodes were placed further apart. It has been found that in a sheet of 7 inches, the electrodes may be placed about 5 inches apart, thus leaving about one inch free along each side edge.

The foils 16a and 16b may be secured in any manner to the sheet to provide uniform conductivity between the foil and sheet. Conductive adhesive may be used although it is preferred to secure the foils 16a and 16b to the paper sheet and to each other by two rows 18 and 18' of spaced non-cotton thread. A thread, such as spun poly thread, nylon and the like may be used. Cotton thread cannot be used, since it deteriorates under even low heat. On the other hand, resinous thread, even if elastic and expandable under heat does not react significantly to low heat.

The resinous thread is double needle stitched to connect the electrodes 16 with the paper sheet 12 since the electrode foiles and the paper are pierced by the needles producing puckered holes 20, insuring contact between the electrodes 16a and 16b and the sheet, as well as providing secure fastening of the electrodes to the paper sheet.

The electrodes 16a and 16b may be further connected to each other by a conductive wire 22 which is applied by a sewing needle only on the bottom surface of the paper sheet 12, since such wire can be pulled from a bobbin source and cannot be applied through the eye of the needle. A preferred conductive wire is Nicrome wire, although other types of highly malleable and flexible conductive wires may also be used in carrying out the practice of this invention.

Electric lead wires 24 and 24' are attached to each of the electrode 16 and terminate an electric plug (not shown) suitable for connection to a conventional source of household electricity. To increase security and the contact of the wires 24, 24' with the electrode foils, a grommet 26 is applied through the foils and paper to which wire 24, 24' may be soldered. Such an arrangement may also be further secured by attaching the foils to the paper in either or both cases, with one or more heavy staples 28.

Figure 2:
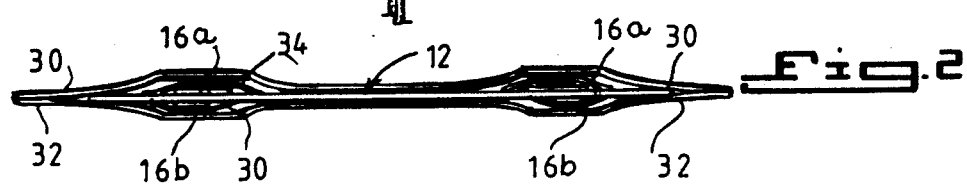
FIG. 2 is a front edge of the unit illustrated in FIG. 1.
Figure 3:
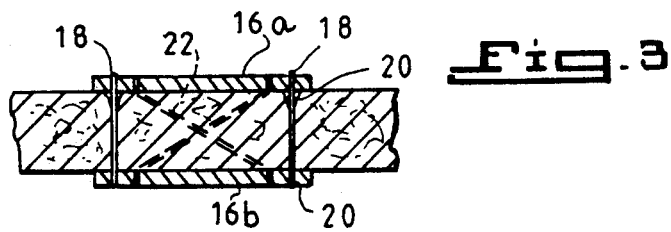
FIG. 3 is a view in section of one pair of electrodes showing their attachment to the conductive sheet and to each other.
Figure 4:
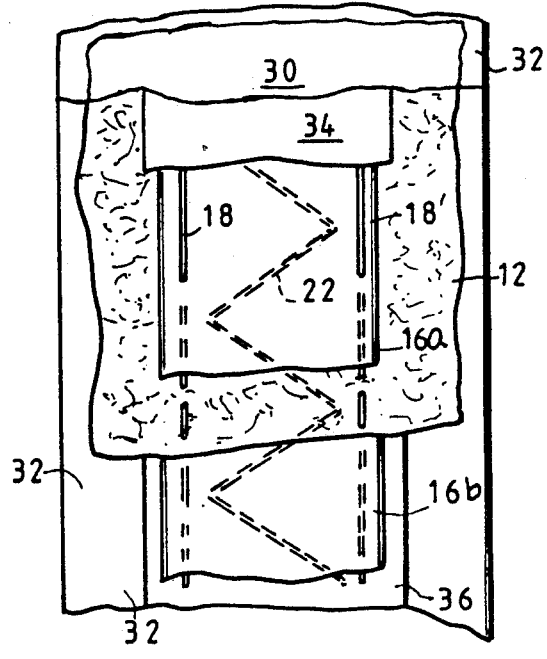
FIG. 4 is an enlarged view of the unit partially broken away to show the attachment of the electrodes to the conductive non-woven sheet and connecting them to each other.

The heating unit 10 is completed by preferably sandwiching it between two layers 30 and 32 of insulating materials as seen in FIGS. 2 and 4. It is preferable to first cover the grommet 26 and foil 16a on the upper surface, and the foil 16b on the lower surface of the sheet 12 with strips of plastic resinous adhesive tape 34 and 36 to insure insulation and provide strong engagement of the terminal end of the wires 24, 24'. The top layer 30 is preferably formed of resilient, somewhat elastic plastic, or rubber insulating sheet, bearing self-sticking adhesive on its lower surface so as to be easily secured over the carbon conductive sheet 12. The lower layer 32 is made of the same or similar material, but preferably of a different color so as to be able to distinguish the top from the bottom of the heating unit. The bottom layer 32 has self-sticking adhesive on both its surfaces so that one surface will easily adhere to the carbon conductive paper sheet and so that the other surface can also be adhered to the bottom or wall of the tank, etc., when in use. The layers 30 and 32 are preferably wider and longer than the conductive sheet 12 so that the peripheral edges of the layers 30 and 32 extend beyond and adhere together forming a complete peripheral seal. The other exterior surfaces of the lower layer 32, is supplied with a plastic peel-off backing for storage and shipment.

In this form the heating element 10 comprises a cohesive, unitary device, sealed about its periphery against normal entry of moisture and properly insulated. The heating unit is relatively flexible and may be bent into a variety of shapes and forms. It may be placed on the floor of the tank as a mat or carpet and secured in place by the adhesive surface, so that the animal can engage it and more over, without dislodging it from its place. It may be stuck against the glass of the vertical wall of the tank and remain there indefinately.

Regular line current, 110–120V, 60 cycles, 15–20 amps is most suitable for energizing the heating unit, although other current sources and voltages can be employed, if desirable, or necessary. When a suitable electric current is applied across the conductive paper sheet between the electrodes 16, it has been found that uniform current flow occurs and that the paper heats up with very little variation across its length and width so that each square unit area thereof provides the same level of heat elevation as each of the others. That is, since the carbon dispersion in the fibre martrix is substantially uniform, there are no large hot spots or cold spots.

The distance between the electrode 16 may be selected, in combination with the electrical characteristics of the paper, so that a desired current flow and/or heat generation is obtained. This may be easily determined by a simple test prior to the securement of the electrodes with the paper sheet.

Figure 5:
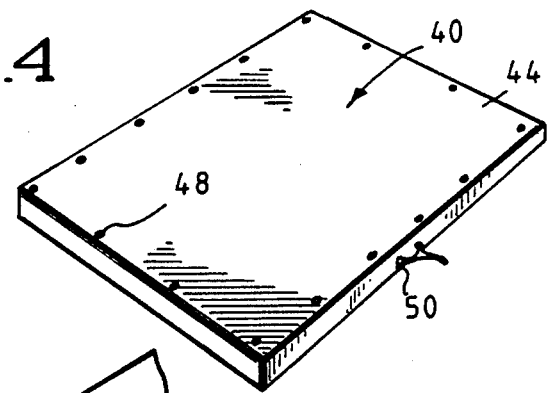
FIG. 5 is an illustration of a housing to hold the heating unit for use in a dry reptile tank heater.
Figure 6:
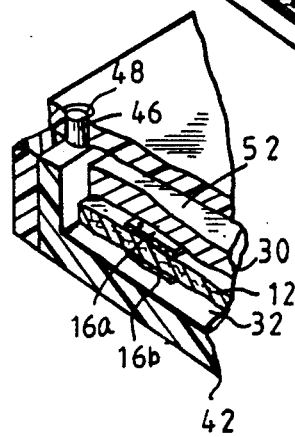
FIG. 6 is an enlarged view, partially broken away of a corner of the container to show its construction.

If desired, electrical heating unit 10, when used in a reptile tank, as well as when used for other purposes, may be housed as seen in FIGS. 5 and 6 within a box-like container 40 having a bottom shell member 42 and a cover member 44 which fits tightly thereover. The bottom member 42 is provided with a plurality of posts 46 and the cover member 44 is provided with a plurality of holes 48 spaced to register with and receive the posts 46 when the cover is fitted to the bottom member. The box-like container 40 is also provided with a pair of notches 50 along one edge to provide exits for the wires 24 and 24'.

In assembling the heating unit within the container, the heating unit is placed between the posts 46 of the shell 42 and adhered to the surface of the bottom 32. The wires 24 and 24' are passed through the notches 50 to the exterior and a glass fibre batting 52 is placed over the heating unit to cut down on circulation and increase concentration of heat. Subsequently, the cover member 44 is placed over the bottom member 42 with post 46 passing through the holes 48, after which the posts may be overturned although a "Timmerman" washer is preferred to hold the two parts together. It may also be desirable to heat weld, or and silicone seal the perimeter of the closed container and around the wires 24 and 24', thus insuring substantial complete insulation of the unit from the outside environment and providing a substantially waterproof enclosure which may be inserted within the reptile tank, or even in a wet tank such as for fish.

The bottom shell member 42 and cover member 44 are preferably made of a suitable water impermeable plastic, such as nylon, polyester, polyethylene or polyurethane plastic material, although it may also be made from metals.

It will be appreciated that the basic form of the present invention lends itself to a large variety of uses and formations. Because the unit is relatively flexible being encased in the rubbery exterior cover sheets 30 and 32, it may be rolled cylindrically or arcuately and encased in plastic, plaster or the like in the shape of a log, a rock, or other simulated natural environmental features, blending material with the animals habitat. Since the overall thickness of the basic unit is only in the range of a few mils, it may be covered with a fabric, or encased in a mat or carpet and used for example, as a foot warmer, blanket, or the like. It is, of course, appreciated that the heating unit may be made in any size, since under the conditions described earlier, the conductive sheet 12 heats uniformly in each square unit of the area.

The heating element may be rolled into a hollow cylinder into which a baby bottle may be placed for warming. A plastic housing may be provided. The flexible heating assembly may be secured in the lining of clothing or the like. Other uses will be apparent.

The heater of this invention is excellent for long term use since it may always be kept on at a low electrical use and resultant heat level. After a short period of use, a large build up of calories occurs and this maintains the unit in a heated condition over an extended period of time, without the need for exterior controls, heat sensors, switching devices or the like, although these may be provided, if desired.

Various modifications, changes and embodiments have been disclosed herein. Others will be obvious to those skilled in the art. Accordingly, it is to be understood that the foregoing disclosure is illustrative only and not limiting of the invention.

What is claimed is:

1. An electrical heating unit comprising a base sheet of fibrous material having metallic particles embedded therein in an arrangement throughout substantially the entire area of said sheet and in a concentration sufficient to permit a low level of electric current to pass through said sheet, and an electrode disposed near each of a pair of opposed edges of said sheet, connectable to a source of electric current, each of said electrodes comprising a narrow foil of highly conductive metal attached to the surface of said sheet and secured to each other and to said base sheet by a stitched thread passing therethrough, said base sheet and foils being sandwiched between a pair of resilient flexible insulating covers extending beyond the peripheral edges of said base sheet and being adhesively secured together to seal said heating unit therein.

2. The heating unit according to claim 1, wherein said sheet comprises non-woven paper impregnated with carbon particles in a random arrangement of substantially uniform concentration.

3. The heating unit according to claim 1 wherein said electrodes are spaced from each other a distance relative to the conductivity of said sheet to provide a selective degree of heat between 5 and 180 degrees F.

4. The heating unit according to claim 1 wherein said thread is a conductive metal.

5. The heating unit according to claim 1 wherein said thread is formed of a resinous material.

6. The heating unit according to claim 1 wherein the outer surface of at least one of said covers is provided with a pull away adhesive layer to allow said heating unit to be secured to a surface in use.

7. The heating unit according to claim 1 wherein said electrodes are spaced from each other a distance relative to the conductivity of said base sheet to provide a flow of current of a magnitude to produce heat in the range of 15 to 180 degrees F.

8. The heating unit according to claim 1 wherein said leads are attached to said electrode foils by securement to a grommet passing through both the first and second foils.

9. The heating unit according to claim 8, including at least one staple passing through both first and second foils securing said foils together.

10. The heating unit according to claim 1 including a rigid outer housing in which said unit is contained.

11. The heating unit according to claim 10 in which said housing comprises a walled container having an open bottom member provided with a plurality of posts located thereon near the periphery thereof, a plurality of notches located in a wall of said container, and a cover member provided with holes to register with and receive said posts when said cover is disposed over the bottom member with the wires attached to said heating unit projecting through said notches.

12. The combination according to claim 8 including fiberglass batting disposed over the heating unit after it is placed in the container.

13. The combination according to claim 9 including welds to hold the cover and bottom member together in a water-tight relationship and silicone glue applied along the perimeter of the container.

* * * * *